(12) United States Patent  (10) Patent No.: US 7,796,041 B2
Petropoulos                      (45) Date of Patent:  Sep. 14, 2010

(54) PLANAR DISTRIBUTED RADIO-FREQUENCY IDENTIFICATION (RFID) ANTENNA ASSEMBLIES

(75) Inventor: Athanasios Petropoulos, Nashua, NH (US)

(73) Assignee: Laird Technologies, Inc., Chesterfield, MO (US)

( * ) Notice: Subject to any disclaimer, the term of this patent is extended or adjusted under 35 U.S.C. 154(b) by 505 days.

(21) Appl. No.: 12/016,627

(22) Filed: Jan. 18, 2008

(65) Prior Publication Data

US 2009/0184827 A1    Jul. 23, 2009

(51) Int. Cl.
    *G08B 13/14*    (2006.01)
(52) U.S. Cl. .................................................. 340/572.7
(58) Field of Classification Search .............. 340/572.7, 340/10.1, 572.1–572.6; 343/742, 824
    See application file for complete search history.

(56) References Cited

U.S. PATENT DOCUMENTS

| 5,061,941 | A * | 10/1991 | Lizzi et al. ................... 343/742 |
| 6,081,238 | A * | 6/2000 | Alicot ......................... 343/742 |
| 6,304,226 | B1 | 10/2001 | Brown et al. |
| 6,373,446 | B2 | 4/2002 | Apostolos |
| 6,618,016 | B1 | 9/2003 | Hannan et al. |
| 7,019,705 | B2 | 3/2006 | Pfletschinger et al. |
| 7,064,714 | B2 | 6/2006 | Lafleur |
| 7,161,538 | B2 | 1/2007 | Zhang et al. |
| 7,183,922 | B2 | 2/2007 | Mendolia et al. |
| 2003/0197653 | A1 | 10/2003 | Barber et al. |
| 2004/0021606 | A1 | 2/2004 | Shigihara |
| 2005/0113138 | A1 | 5/2005 | Mendolia et al. |
| 2005/0116875 | A1 | 6/2005 | Yuanzhu et al. |
| 2005/0140552 | A1 | 6/2005 | Lafleur |
| 2005/0179604 | A1 * | 8/2005 | Liu et al. .................... 343/742 |
| 2006/0226989 | A1 | 10/2006 | Hillegass |
| 2006/0284778 | A1 | 12/2006 | Sanford et al. |
| 2007/0040689 | A1 * | 2/2007 | Reynolds ................. 340/572.7 |

(Continued)

FOREIGN PATENT DOCUMENTS

EP            1178568           2/2002

(Continued)

OTHER PUBLICATIONS

Zhong-Min Liu et al: "A 3 Patch Near Field Antenna for Conveyor Bottom Read in RFID Sortation Application" Antennas and Propagation Society International Symposium 2006, IEEE, Oct. 14-17, 2003, 1043-1046, 4 pages.

*Primary Examiner*—Phung Nguyen
(74) *Attorney, Agent, or Firm*—Harness, Dickey & Pierce, P.L.C.

(57) ABSTRACT

Disclosed are exemplary embodiments of passive radio-frequency identification (RFID) readers operable for creating a relatively uniform near field adjacent a planar surface for reading RFID tags generally above the planar surface. The RFID reader may include a plurality of antenna elements distributed in an array underneath the planar surface. A central antenna element may be located within the array generally between two or more perimetric antenna elements. A network may distribute electromagnetic energy to the antenna elements such that a current phase of at least one perimetric antenna element is out of phase with and lagging a current phase of the central antenna element. Alternatively, the perimetric antenna elements may be parasitically coupled to the central antenna element, such that a current phase of at least one perimetric antenna element is out of phase with and lagging a current phase of the central antenna element.

31 Claims, 18 Drawing Sheets

U.S. PATENT DOCUMENTS

Figure 1:
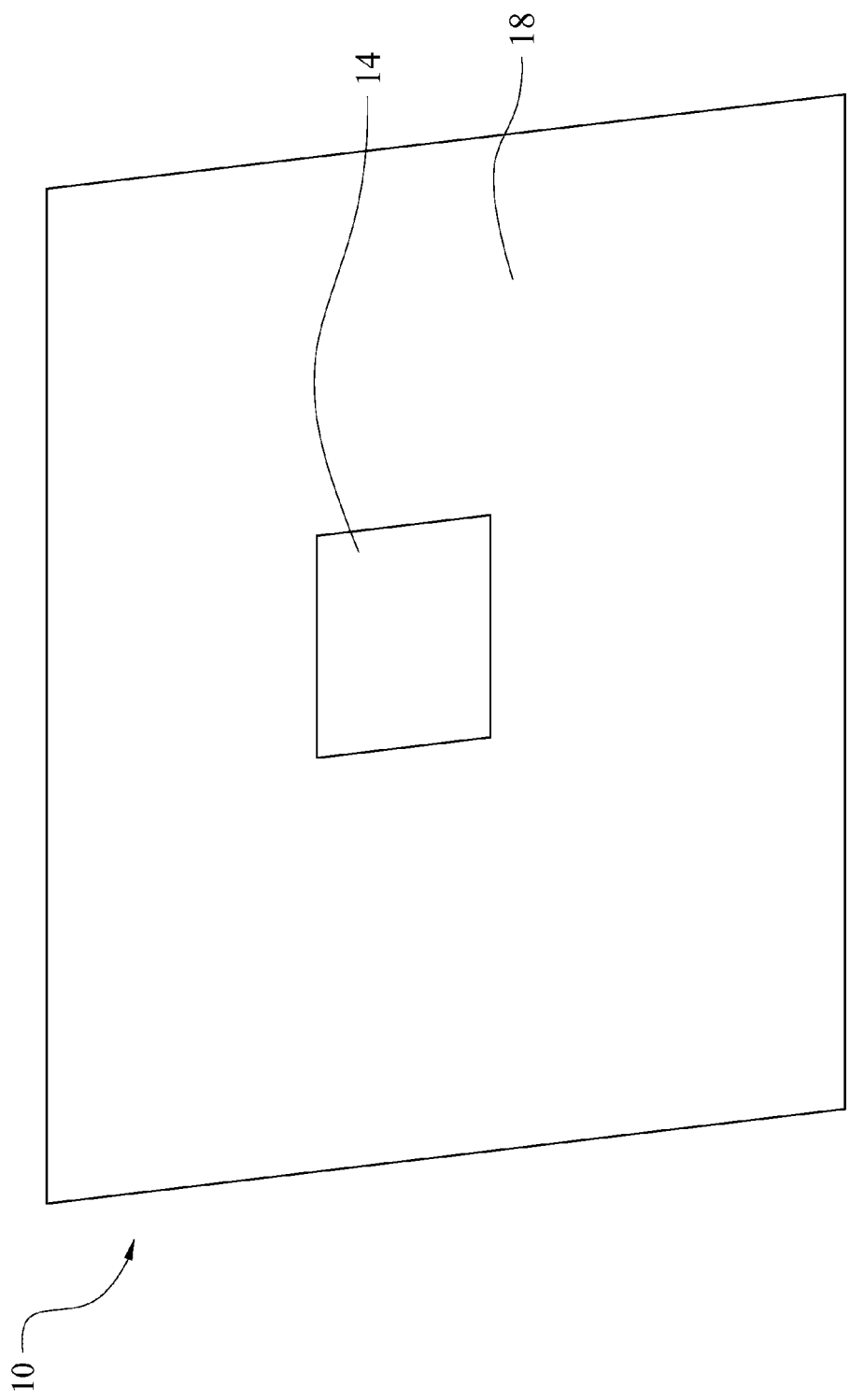

2007/0080888 A1    4/2007  Mohamadi
2007/0085751 A1    4/2007  Kai et al.
2007/0109210 A1*   5/2007  Bacquet et al. ............. 343/742
2007/0222609 A1    9/2007  Duron et al.

FOREIGN PATENT DOCUMENTS

WO    WO 99/60512      11/1999
WO    WO2007/032690     3/2007

* cited by examiner

PLANAR DISTRIBUTED RADIO-FREQUENCY IDENTIFICATION (RFID) ANTENNA ASSEMBLIES

FIELD

The present disclosure relates to planar distributed RFID antenna assemblies having a substantially uniform near field and a relatively low far-field gain.

BACKGROUND

The statements in this section merely provide background information related to the present disclosure and may not constitute prior art.

Radio-frequency identification (RFID) generally refers to the automatic identification method using radio waves that relies on storing and remotely retrieving data from devices called RFID tags or transponders. RFID readers are the devices used to read the information or data in the RFID tag. The RFID tag may be attached to or incorporated into various things, such as commercial products, etc.

RFID tags may be chip-based and contain antennas and integrated circuits. The particular antenna used for a RFID tag is usually affected by the intended application and the frequency of operation. To this end, some RFID tags include patch-antennas. RFID tag antennas are relatively low power antennas configured to obtain enough microwave power from a more powerful RFID reader antenna to "charge" an integrated circuit of the RFID tag. The integrated circuit keeps or stores information about the tagged item, such as price of the consumer good being purchased, etc. RFID tag antennas are designed to work with their specific integrated circuits by matching the RFID tag antennas to the high impedance of their integrated circuits.

In comparison, RFID reader antennas are more complicated antennas than RFID tag antennas. For example, RFID reader antennas have much higher power requirements and are circularly polarized. Conversely, RFID tag antennas are fairly inexpensive antennas (e.g., antennas printed on plastic sheets). RFID tag antennas also may have much simpler polarization requirements (e.g., linear polarization) compared to the polarization requirements for RFID reader antennas (e.g., circular polarization).

SUMMARY

According to various aspects, exemplary embodiments are provided of passive radio-frequency identification (RFID) readers operable for creating a relatively uniform near field adjacent a planar surface for reading RFID tags generally above the planar surface. In some embodiments, the RFID reader may include a plurality of antenna elements distributed in an array underneath the planar surface. A central antenna element may be located within the array generally between two or more perimetric antenna elements.

In some embodiments, a network may distribute electromagnetic energy to the antenna elements such that a current phase of at least one of the perimetric antenna elements is out of phase with and lagging a current phase of the central antenna element. The antenna elements may be capable of being turned on at different times for avoiding high far field gain, such that an RFID tag is activated from a corresponding one of the antenna elements that is substantially directly underneath the RFID tag at the time the corresponding antenna element is turned on.

In other embodiments, the two or more perimetric antenna elements may be parasitically coupled to the central antenna element, such that a current phase of at least one of the perimetric antenna elements is out of phase with and lagging a current phase of the central antenna element, thereby reducing far field gain.

In further embodiments, an RFID reader may include first and second antenna elements. The second antenna element may generally surround the first antenna element. The first antenna element may have a length of about one-half wavelength. The second antenna element may have a perimeter length of about two wavelengths. The second antenna element may be parasitically coupled to the first antenna element such that, when a first order mode is excited on the first antenna element, a second order mode is excited on the second antenna element through the parasitic coupling from the first antenna element.

Further aspects relate to methods relating passive RFID readers. One exemplary embodiment provides a method relating to the operation of a passive radio-frequency identification (RFID) reader that includes a plurality of antenna elements distributed in an array generally evenly underneath a planar surface and operable for creating a relatively uniform near field adjacent the planar surface for reading RFID tags generally above the planar surface. In this exemplary embodiment, the method may include turning on the antenna elements at different times such that a RFID tag above the planar surface is activated from a corresponding one of the antenna elements that is substantially directly underneath the RFID tag at the time the corresponding antenna element is turned on. Turning on the antenna elements at different times may thus help avoid high far field gain.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
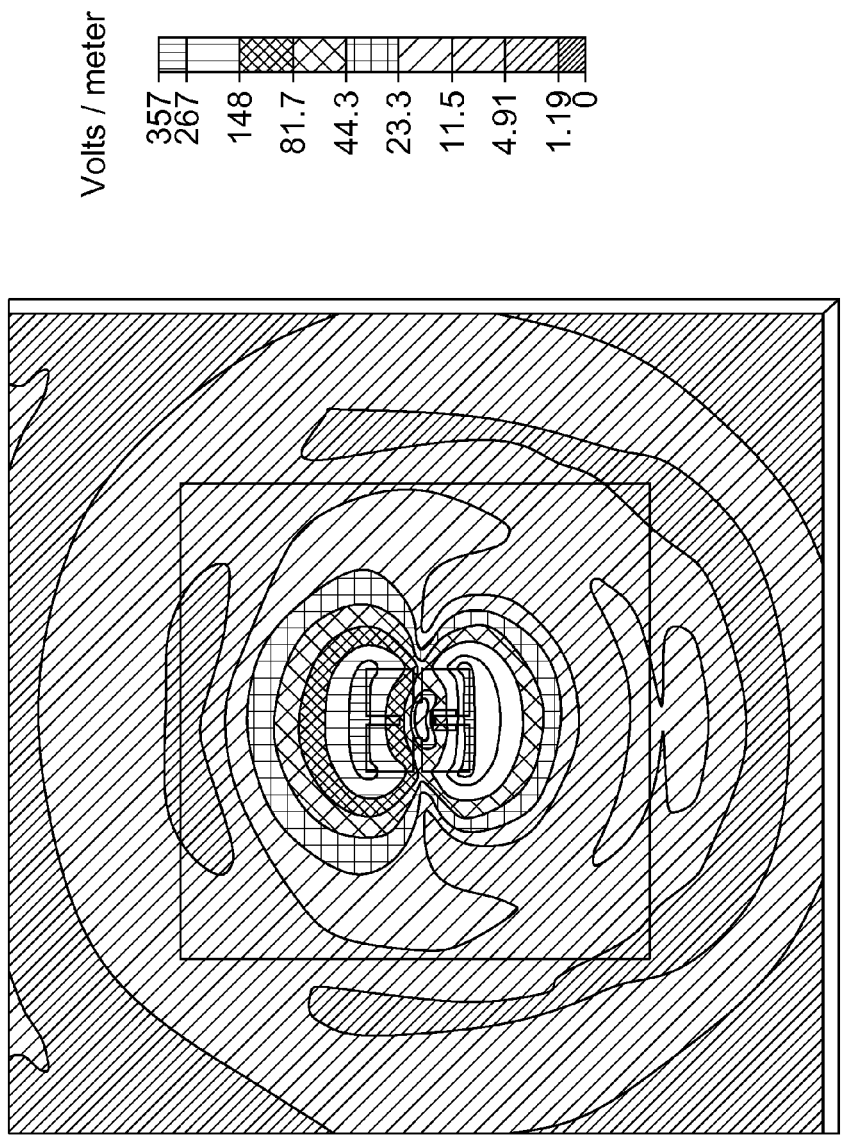
Figure 3:
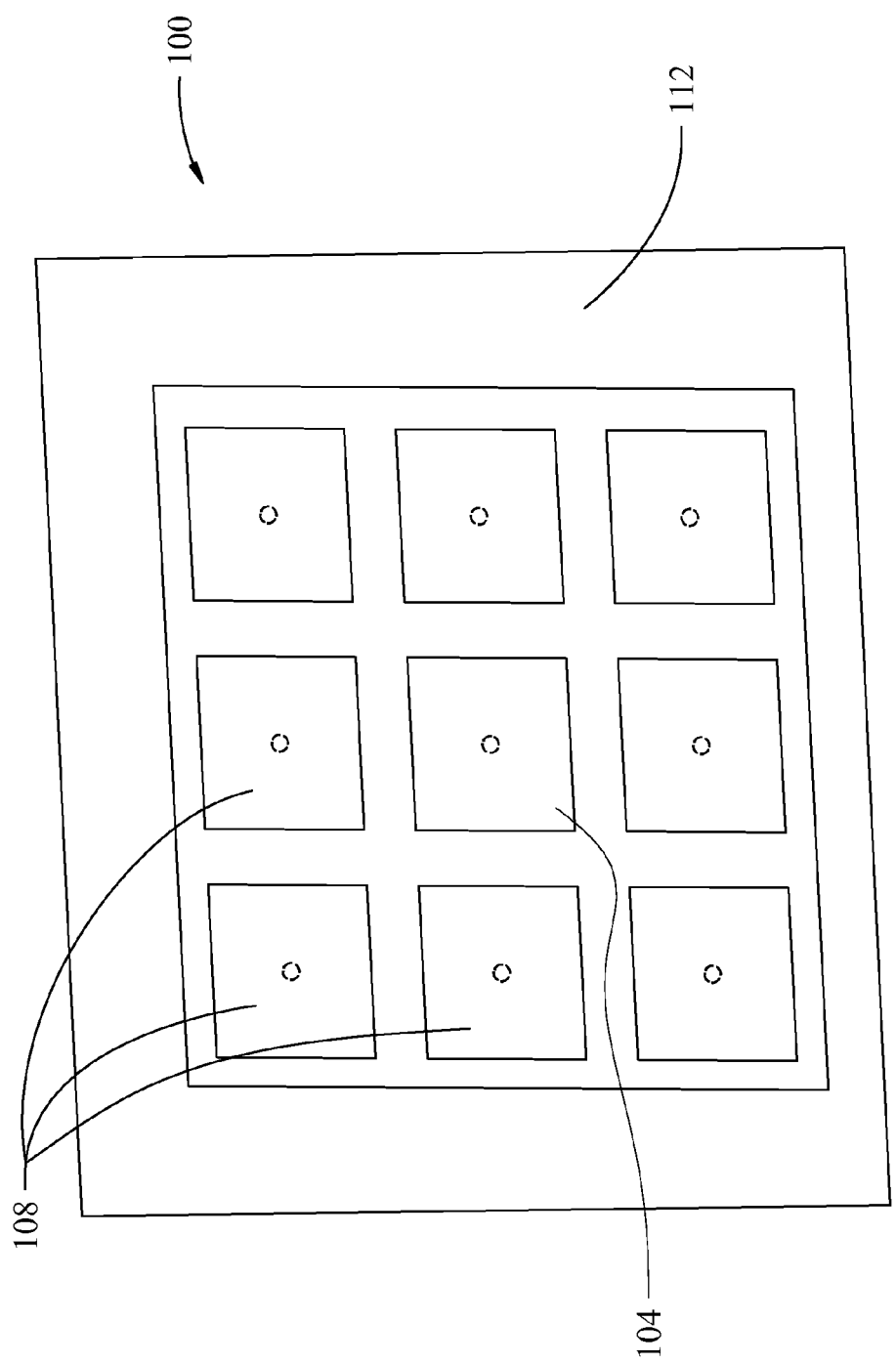
Figure 4:
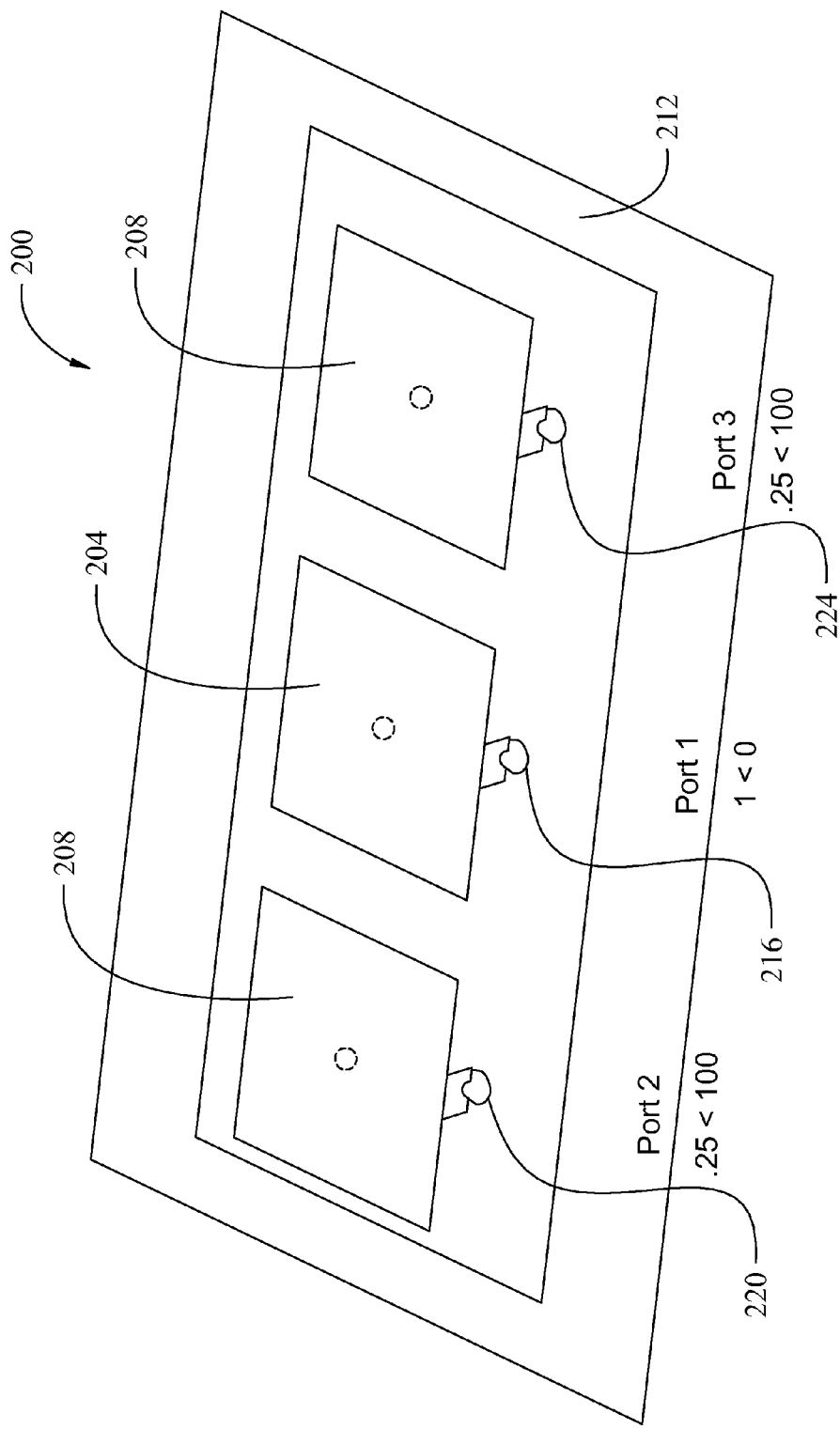
Figure 4A:
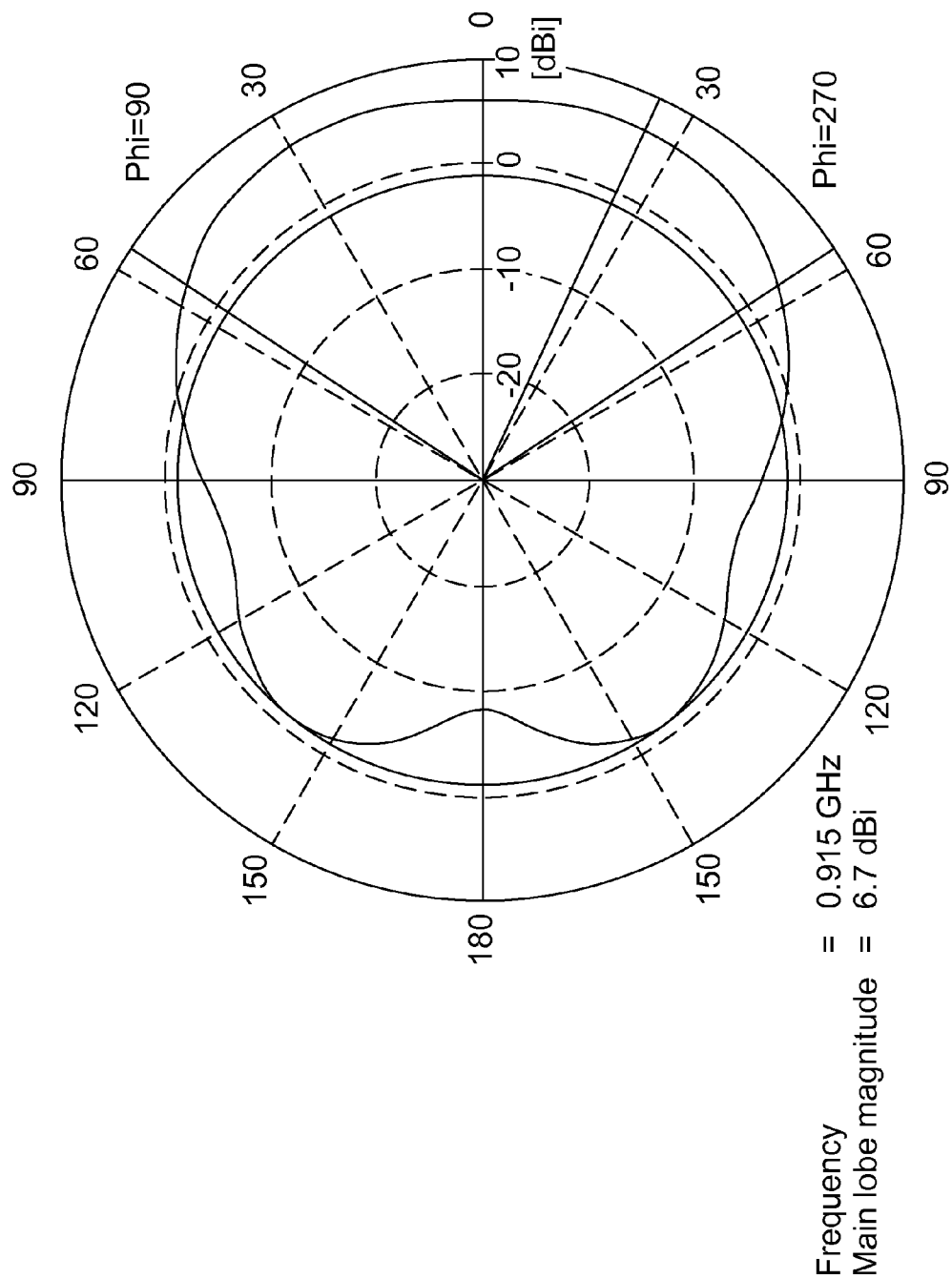
Figure 5:
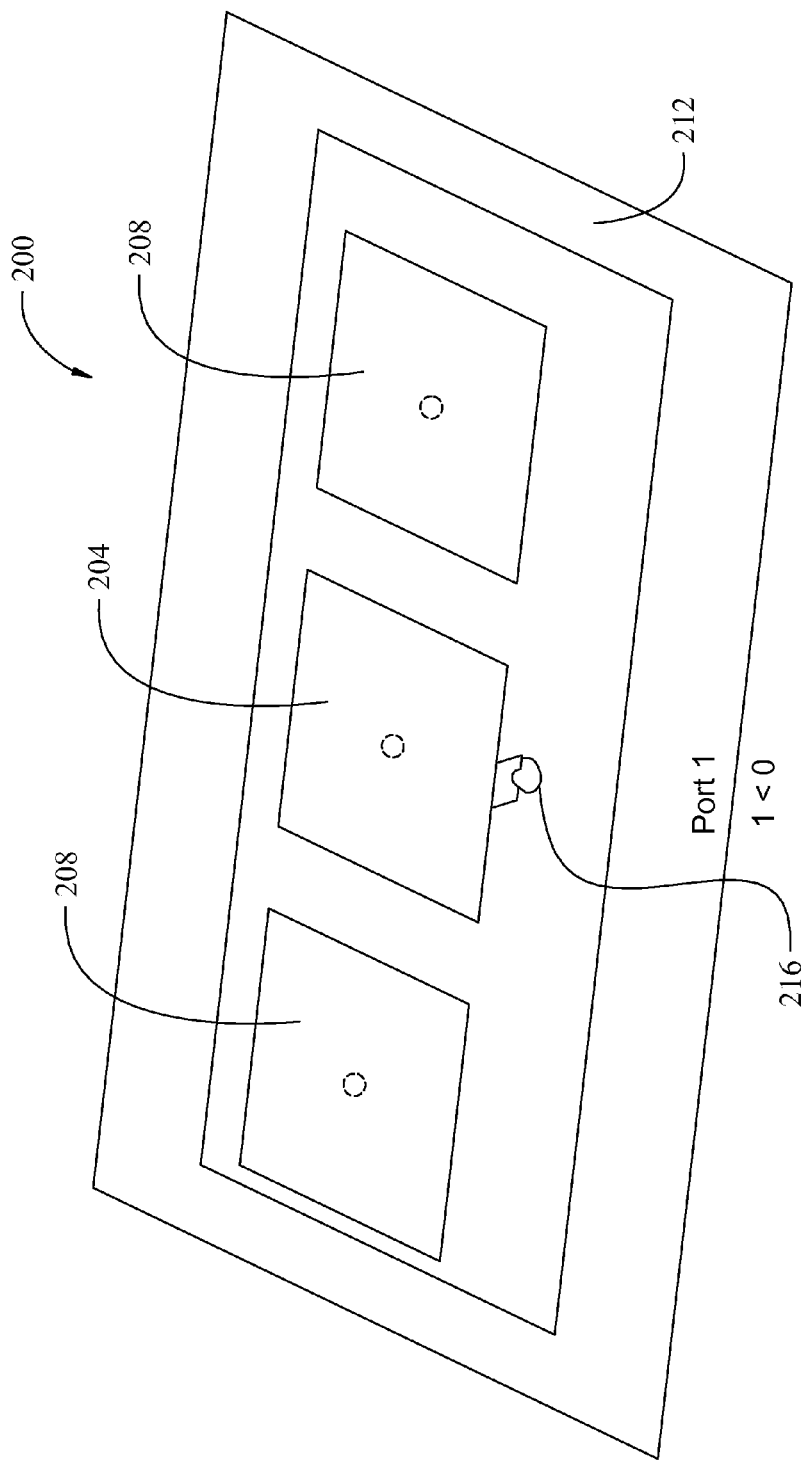
Figure 6:
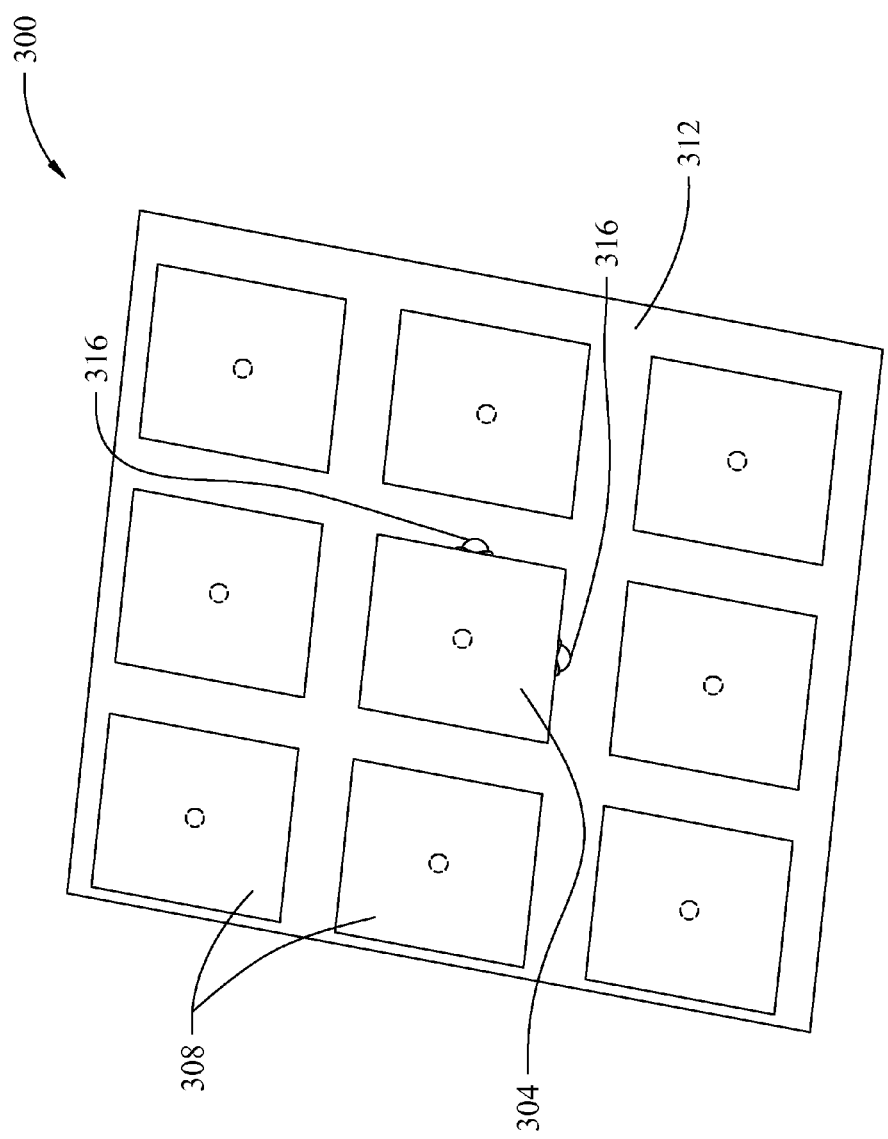
Figure 7:
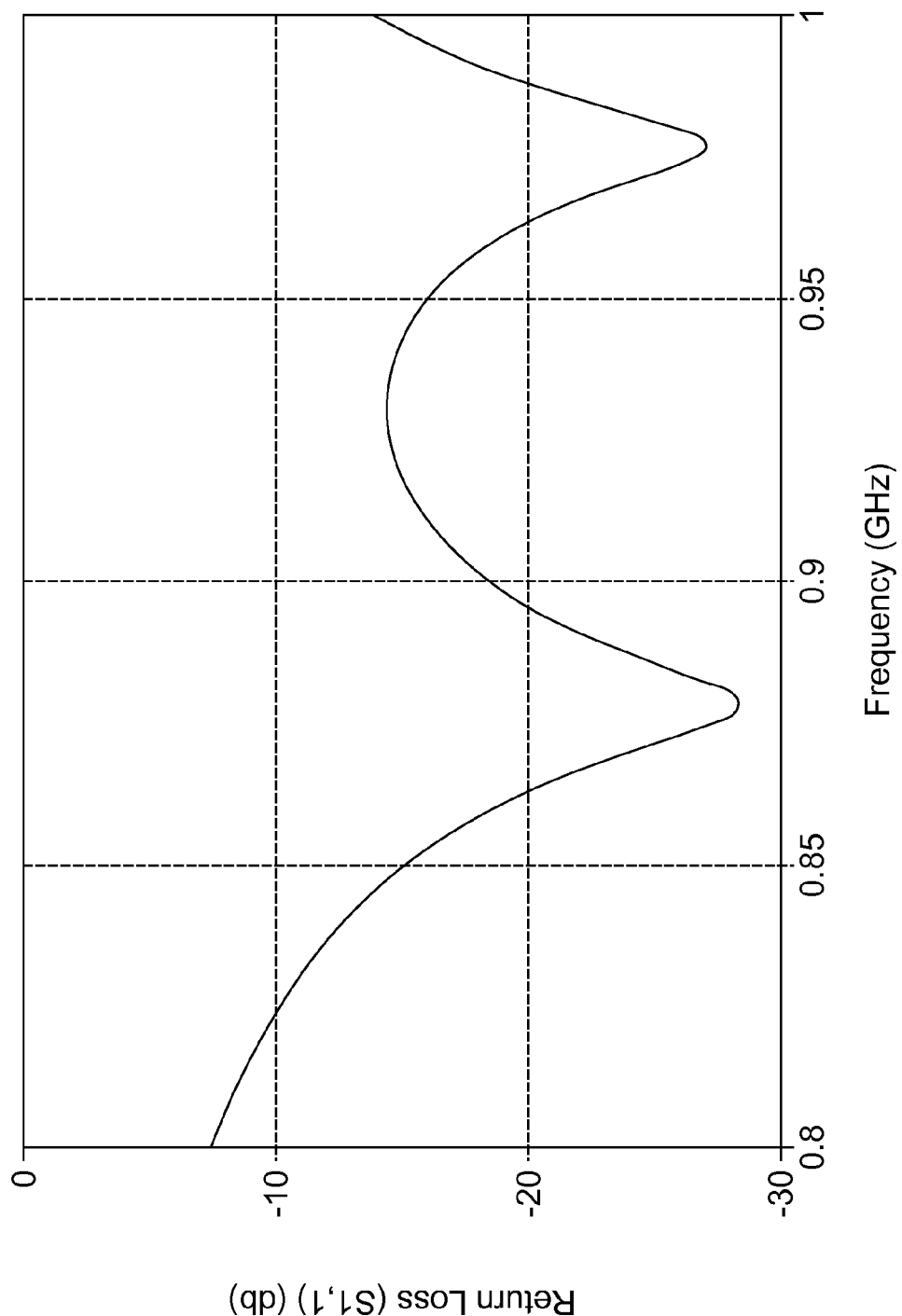
Figure 8:
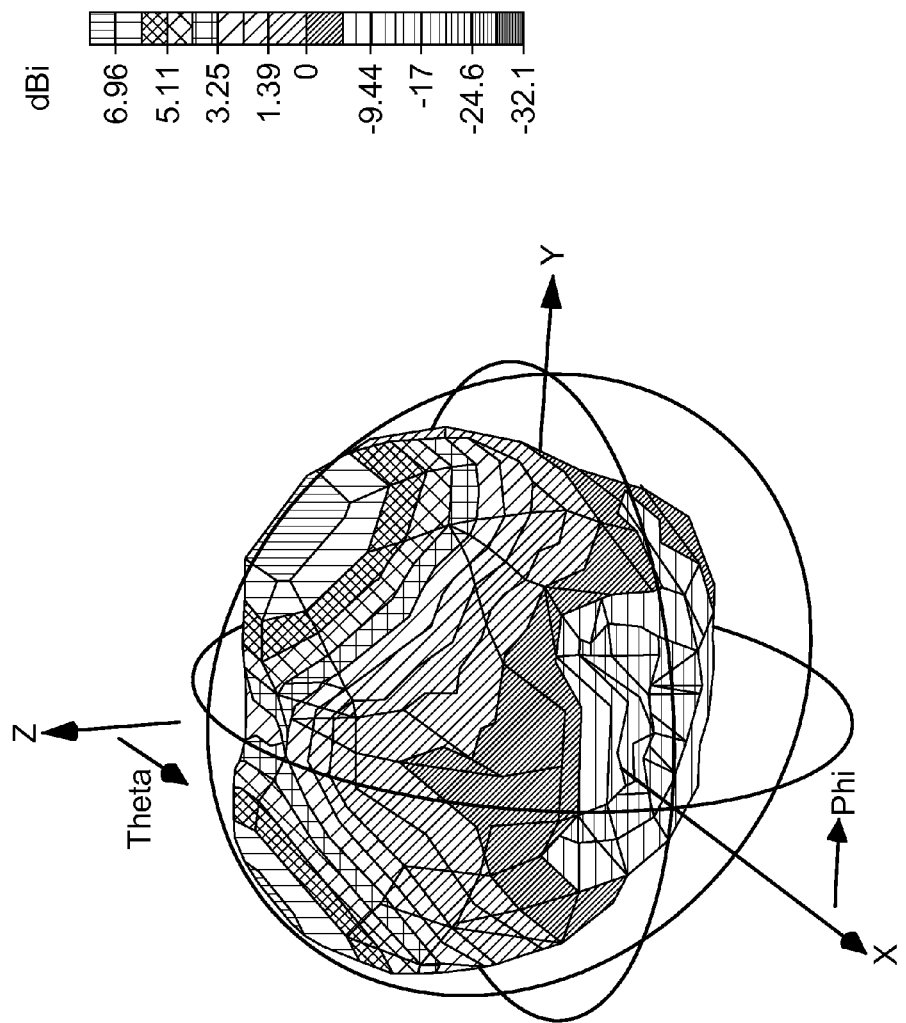
Figure 9:
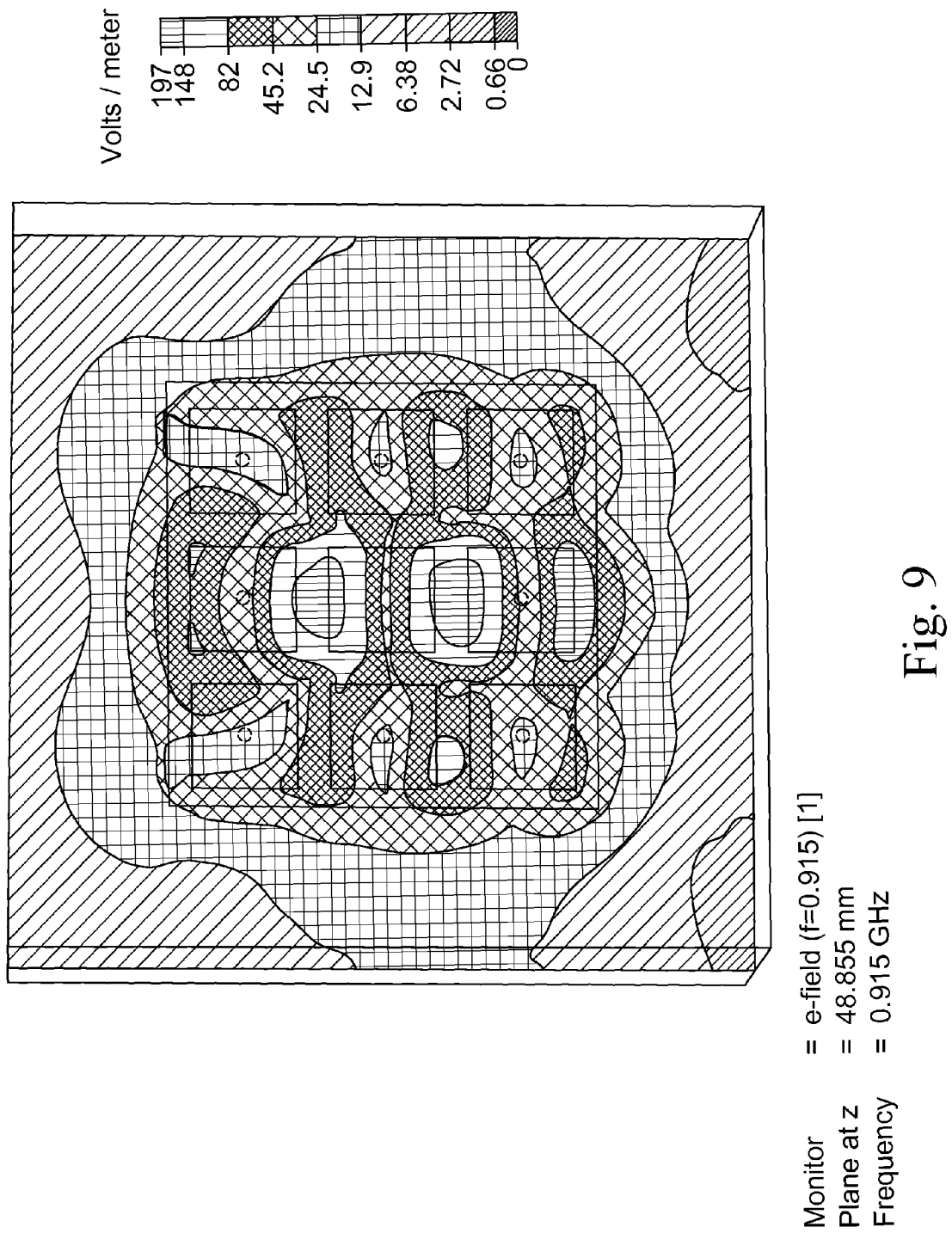
Figure 10:
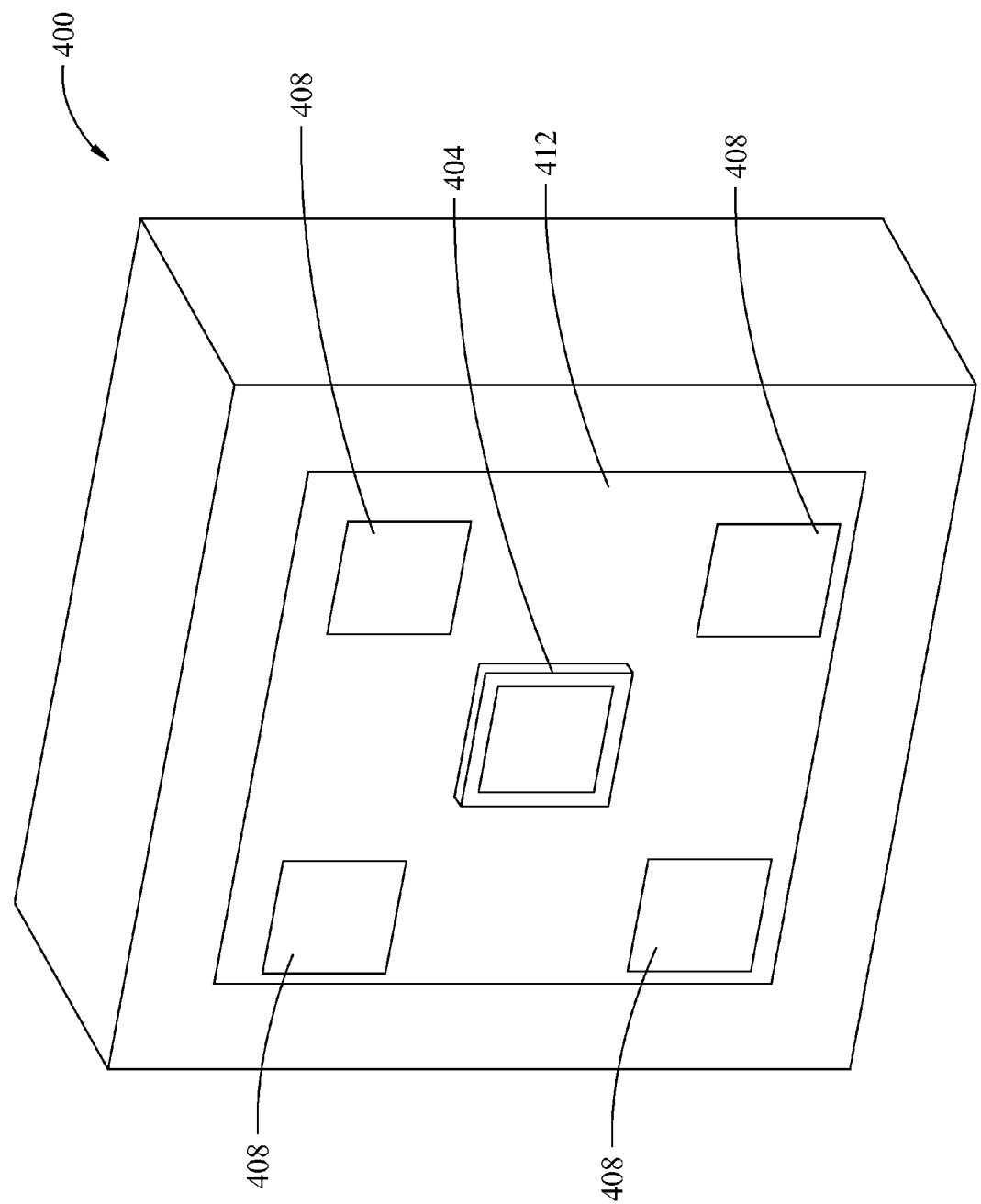
Figure 11:
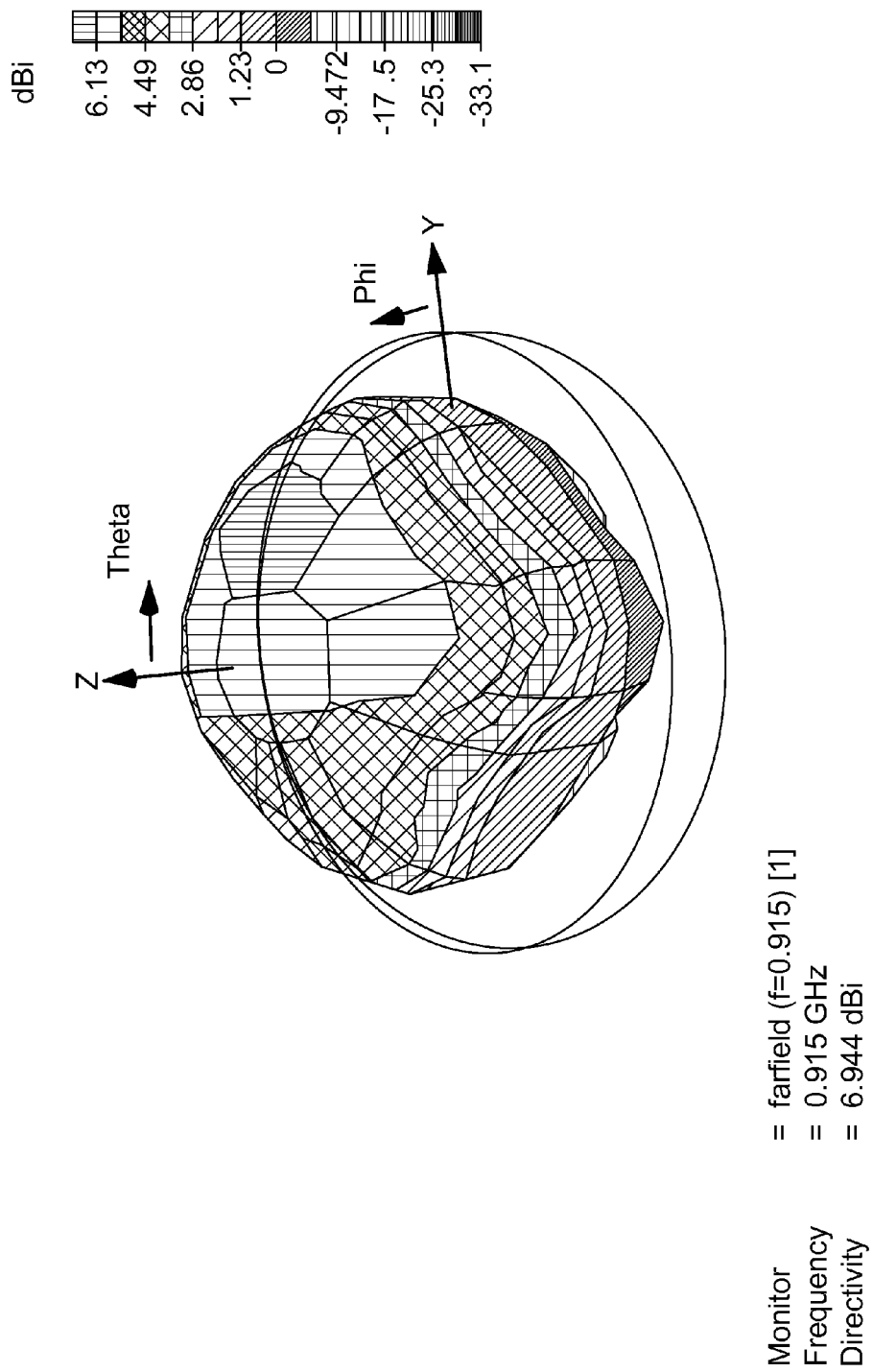
Figure 12:
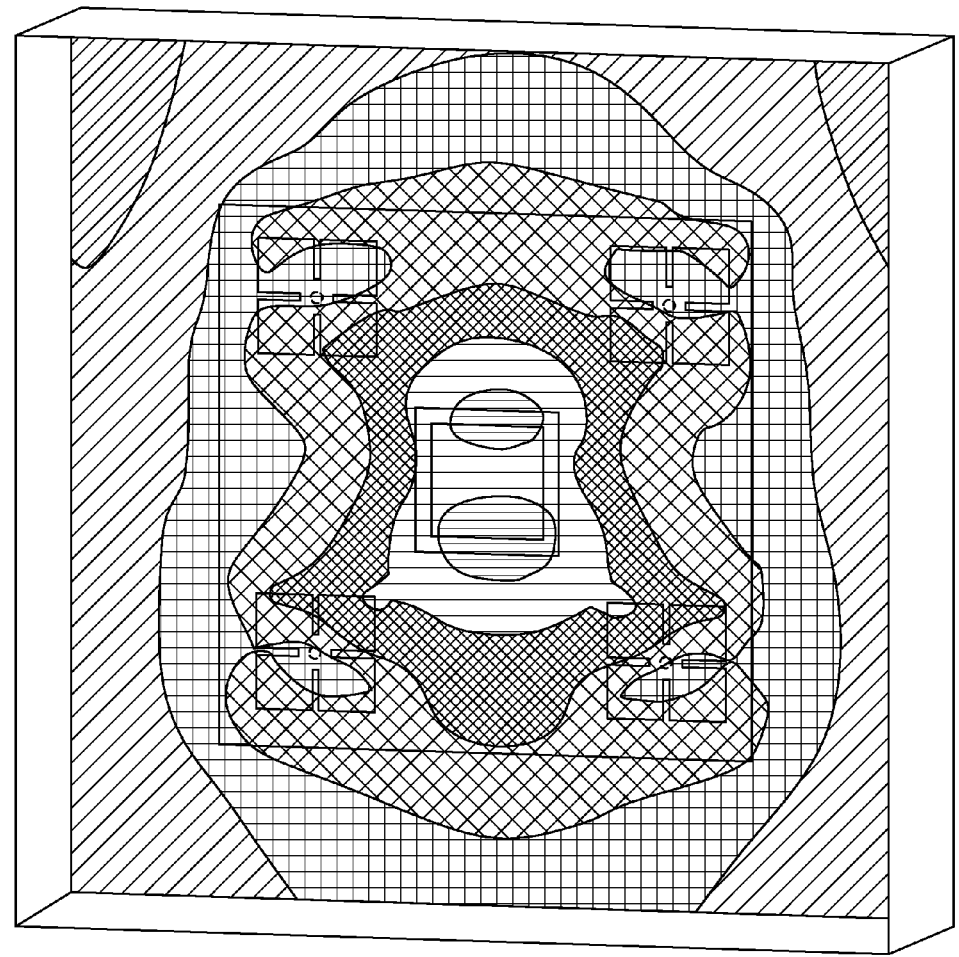
Figure 12:
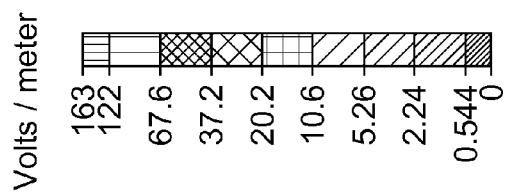
Figure 13:
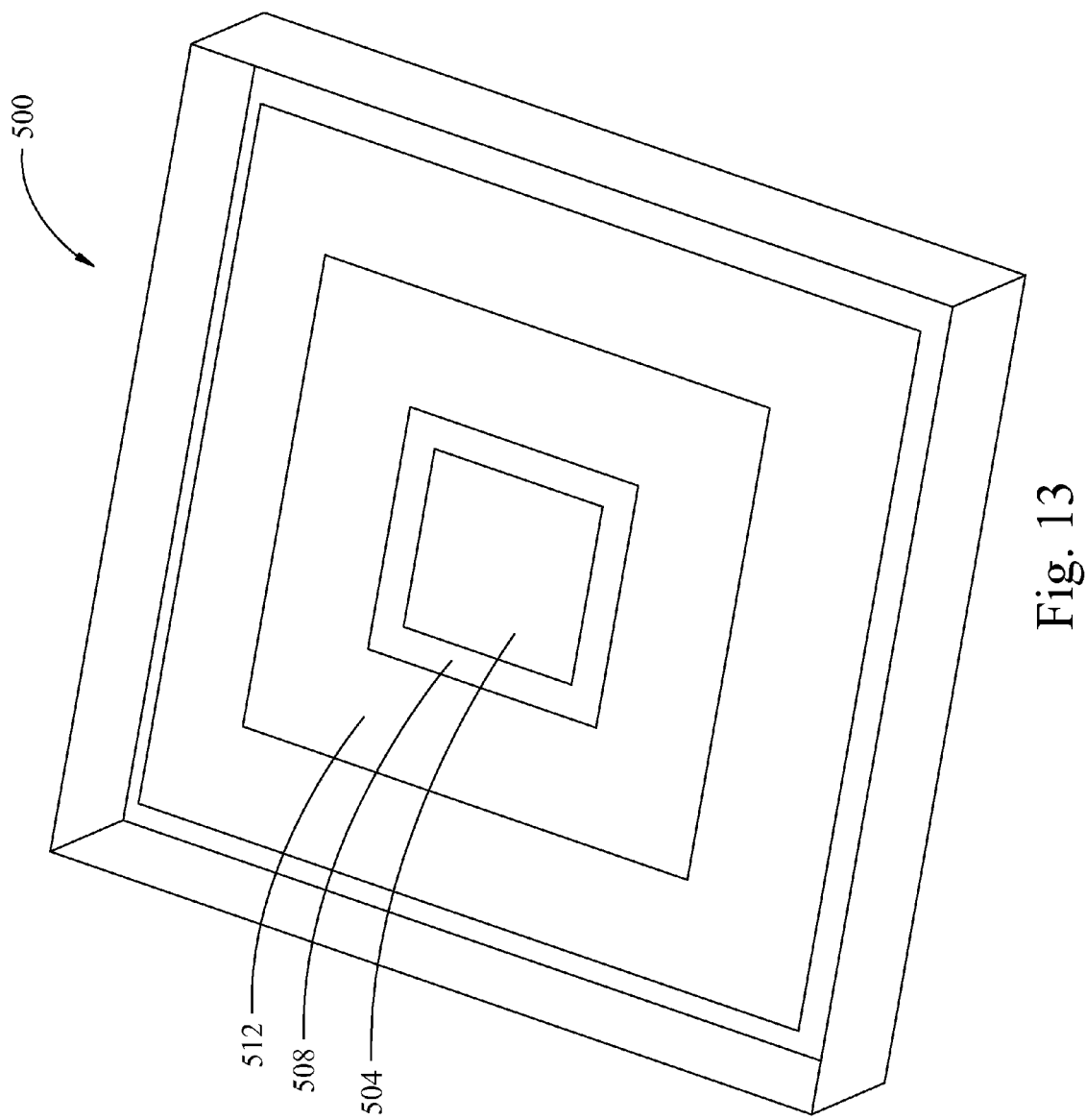
Figure 14:
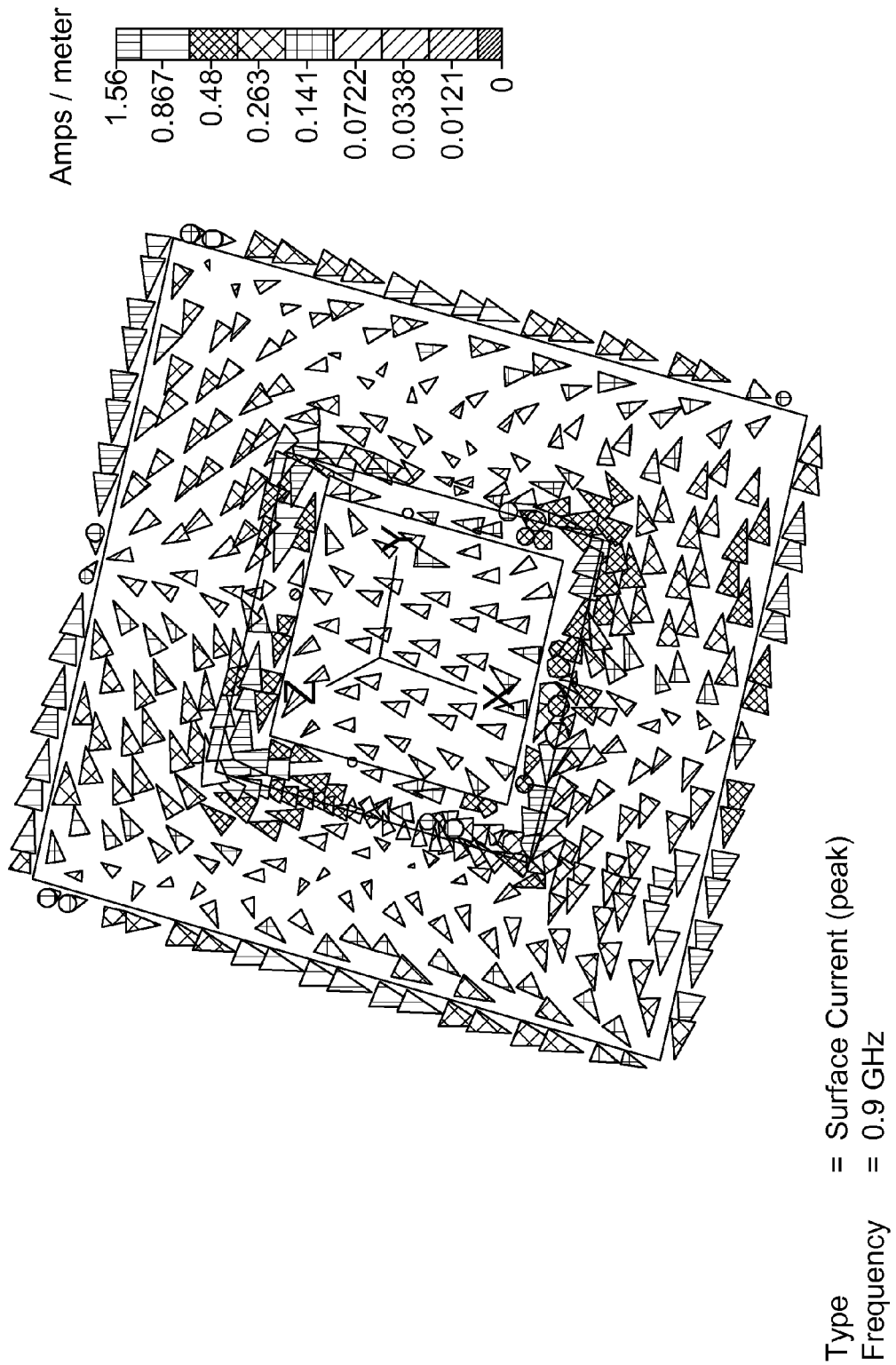
Figure 15:
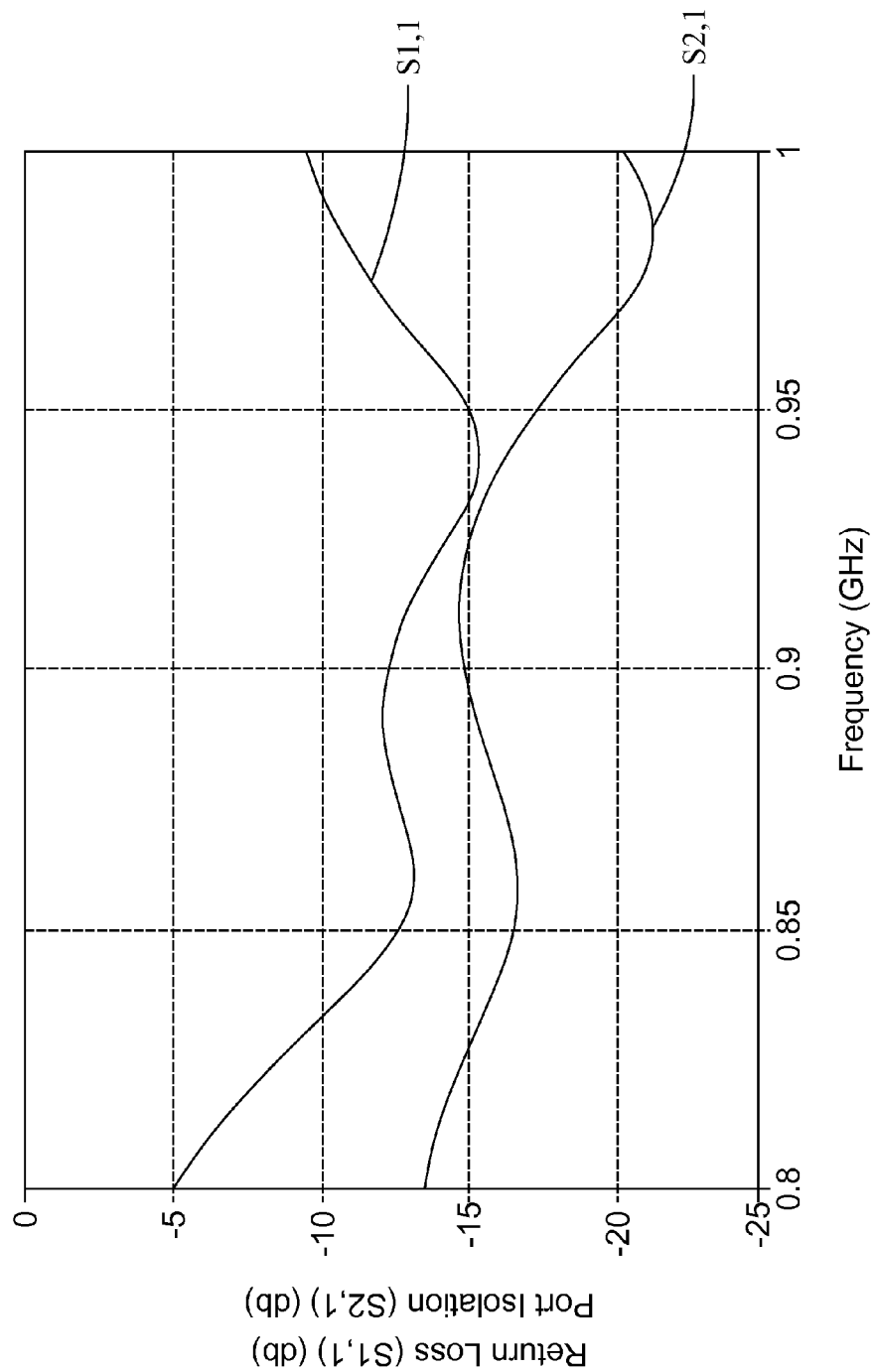
Figure 16:
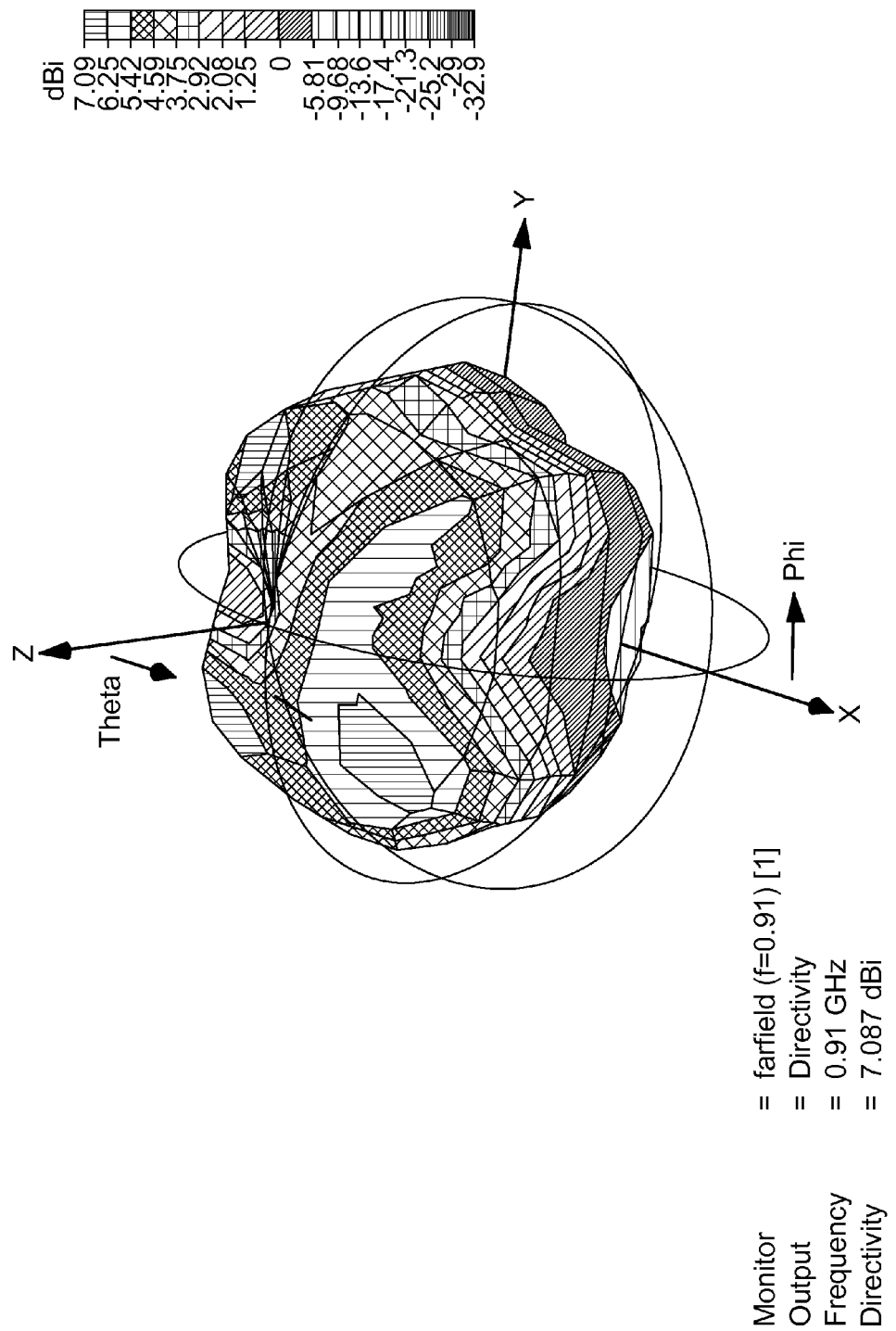
Figure 17:
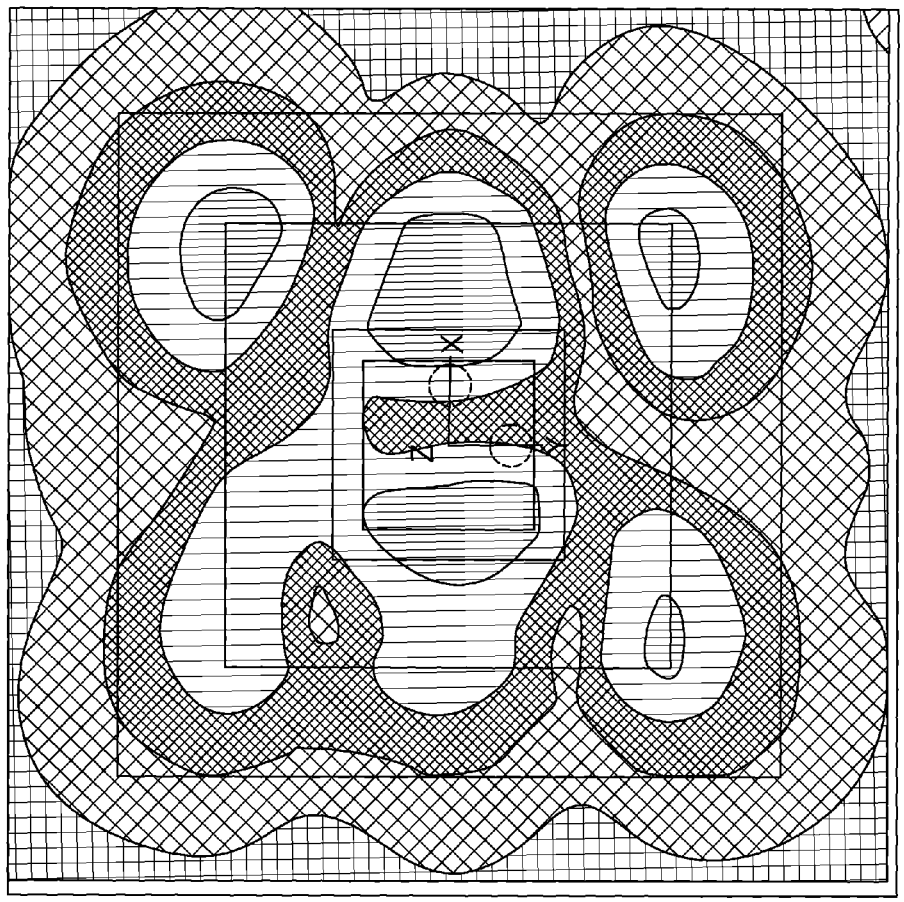
Figure 17:
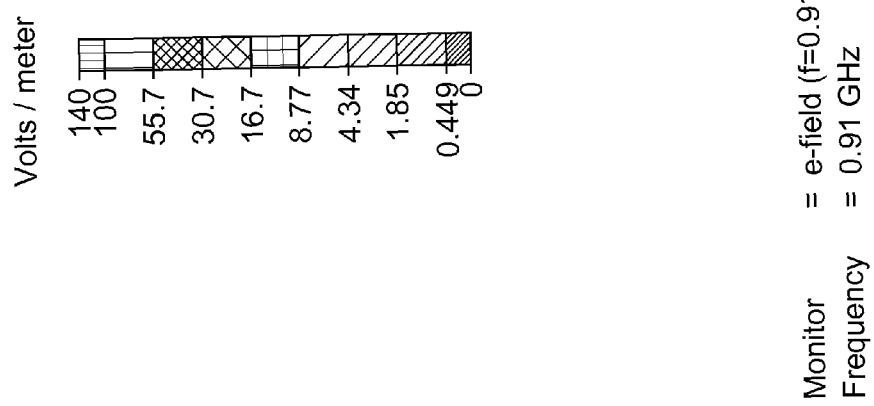

FIG. 1 illustrates a conventional RFID reader having a single patch-antenna configured to radiate linear or circularly polarized waves towards a RFID tag;

FIG. 2 graphically illustrates exemplary simulated test results of near field in volts per meter (V/m) of the RFID reader shown in FIG. 1 at a frequency of 915 MHz and at a plane above and parallel to the ground plane;

FIG. 3 illustrates a conventional planar distributed RFID reader having an 3×3 array of patch-antennas distributed uniformly or evenly under a planar surface such that there are eight perimetric patch-antennas generally about one central patch-antenna;

FIG. 4 illustrates a planar distributed RFID reader having a 1×3 array of patch-antennas distributed uniformly or evenly under a planar surface such that there is one central patch-antenna positioned generally between two perimetric patch-antennas according to another exemplary embodiment in which the central patch-antenna is excited with a voltage of one volt with zero degree phase delay (1<0) and each perimetric patch-antenna is excited with a voltage of 0.25 volts with 100 degrees phase delay (0.25<100);

FIG. 4A graphically illustrates exemplary simulated test results of azimuth far field gain for the RFID reader shown in FIG. 4 at a frequency of 915 MHz and a main lobe magnitude of 6.7 dBi (decibels referenced to isotropic gain);

FIG. 5 illustrates a planar distributed RFID reader having a 1×3 array of patch-antennas distributed uniformly or evenly under a planar surface such that there is one central patch-antenna positioned generally between two perimetric patch-antennas according to another exemplary embodiment in which only the central patch-antenna is fed with a voltage of one volt with zero degrees phase delay (1<0) and the perimetric patch-antennas are fed parasitically from the central patch-antenna;

FIG. 6 illustrates a planar distributed RFID reader having an 3×3 array of patch-antennas where the central patch-antenna is fed by two ports and the remaining eight perimetric patch-antennas are parasitically fed and coupled electromagnetically, according to another exemplary embodiment;

FIG. 7 graphically illustrates exemplary simulated test results of return loss (S1,1) in decibels versus frequency in Gigahertz for the ports associated with the central patch-antenna of the RFID reader shown in FIG. 6;

FIG. 8 graphically illustrates exemplary simulated test results of far field directivity/gain pattern for the RFID reader shown in FIG. 6 at a frequency of 915 MHz and directivity is 7.890 dBi (decibels referenced to isotropic gain);

FIG. 9 graphically illustrates exemplary simulated test results of near field in volts per meter (V/m) of the RFID reader shown in FIG. 6 at a frequency of 915 MHz and at a plane above and parallel to the ground plane;

FIG. 10 illustrates a planar distributed RFID reader having a central dual polarized patch-antenna fed by two ports and four perimetric patch-antennas that are parasitically fed and coupled electromagnetically, according to another exemplary embodiment;

FIG. 11 graphically illustrates exemplary simulated test results of far field directivity/gain pattern for the RFID reader shown in FIG. 10 at a frequency of 915 MHz and directivity is 6.944 dBi (decibels referenced to isotropic gain);

FIG. 12 graphically illustrates exemplary simulated test results of near field in volts per meter (V/m) of the RFID reader shown in FIG. 10 at a frequency of 915 MHz and at a plane above and parallel to the ground plane;

FIG. 13 illustrates a planar distributed RFID reader having an inner patch-antenna and an outer patch-antenna about the inner patch-antenna, according to another exemplary embodiment;

FIG. 14 graphically illustrates exemplary simulated test results of the surface currents in amps per meter (A/m) for the inner and outer patch-antennas of the RFID reader shown in FIG. 13 at a frequency of 900 MHz;

FIG. 15 graphically illustrates exemplary simulated test results of return loss (S1,1) and port isolation (S2,1) between the two ports in decibels versus frequency in Gigahertz for the ports associated with the central patch-antenna of the RFID reader shown in FIG. 13;

FIG. 16 graphically illustrates exemplary simulated test results of far field directivity/gain pattern for the RFID reader shown in FIG. 13 at a frequency of 910 MHz and directivity is 7.087 dBi (decibels referenced to isotropic gain); and FIG. 17 graphically illustrates exemplary simulated test results of near field in volts per meter (V/m) of the RFID reader shown in FIG. 13 at a frequency of 910 MHz and at a plane above and parallel to the ground plane.

DETAILED DESCRIPTION

The following description is merely exemplary in nature and is not intended to limit the present disclosure, application, or uses.

Various exemplary embodiments of planar distributed antenna assemblies are disclosed, which may be used in RFID readers having substantially uniform near fields and relatively low far field gains.

In some embodiments, parasitic antenna elements may be placed around a central antenna element. The antenna elements may be configured such that a substantially uniform near field can be created while the far-field gain is kept low.

Other aspects include methods relating to using RFID readers. Further aspects relate to RFID systems that include RFID readers and RFID tags. A RFID tag may include an antenna and an integrated circuit operable for storing information. The tag antenna may be operable for receiving energy radiated by the antenna elements of the RFID reader for powering the integrated circuit. The RFID reader may be operable for transmitting a signal to the RFID tag and for receiving a response to the signal from the RFID tag to recognize information of the RFID tag.

As an example, RFID readers may be used to read RFID tags and determine prices of items that are swept close to a planar surface at a grocery store checkout line. Accordingly, RFID readers are preferably configured to be able to reliably read RFID tags. This, however, presents several challenges (which at least some exemplary embodiments disclosed herein overcome). For example, the planar surface over which the RFID tags may be positioned (e.g., swiped across, etc.) may be several wavelengths long. And, a RFID reader preferably is able to still reliably read an arbitrarily oriented RFID tag located in an arbitrary location near the planar surface. This means that the near field at the planar surface should preferably be substantially uniform for the RFID tag to be in a strong enough electric field to be read. Moreover, the far field of the RFID reader should preferably be low enough so as to not interfere with other RFID readers and other electromagnetic devices in the vicinity. The simultaneous requirements of a substantially uniform near field as well as relatively low far field gain makes this electromagnetic problem challenging.

For example, FIG. 1 illustrates a conventional RFID reader 10 having a single patch-antenna 14 configured to radiate linear or circularly polarized waves towards a RFID tag. FIG. 2 graphically illustrates exemplary simulated test results of near field for the single-patch conventional RFID reader 10. As shown in FIG. 2, the single-patch conventional RFID reader 10 does not produce a uniform near field. Instead, the near field varies greatly across the patch-antenna 14 and above planar surface 18. Thus, this single-patch RFID reader 10 would not be able to reliably read RFID tags located a significant distance away from the center of the patch-antenna 14 or planar surface 18, given the relatively weak near field at these locations. Accordingly, the inventors hereof have developed various exemplary embodiments of antenna assemblies having electromagnetic structures that distribute the near field electromagnetic energy approximately uniform at least in the vicinity of the planar surface.

FIG. 3 also illustrates a conventional planar distributed RFID reader 100. As shown, this particular conventional RFID reader 100 includes a 3×3 array of patch-antennas 104, 108 distributed uniformly or evenly under a planar surface 112 such that there are eight perimetric patch-antennas 108 generally about one central patch-antenna 104. In this conventional reader 100, each of the patch-antennas 104, 108 is fed or excited by a different port such that the reader 100 includes nine ports.

In accordance with aspects of the invention (and unlike conventional RFID readers having a 3×3 array of patch-antennas), various embodiments of the present invention include an RFID reader (e.g., 100, etc.) that is provided with a network that distributes electromagnetic energy to the patch-antennas (e.g., 104, 108 of the RFID reader 100, etc.). With continued reference to FIG. 3, one exemplary embodiment includes the patch-antennas 104, 108. Each patch-antenna 104, 108 covers an area underneath the planar surface 112 and is responsible to turn on a RFID tag that is above that particular patch-antenna's area. With this particular embodiment, the network distributes the electromagnetic energy to the patch-antennas 104, 108 in a manner such that the patch-antenna 104, 108 are preferably not all in the same phase, which helps avoid creating a directional array with high far field gain. As noted above, a low far field gain may be a preferred consideration depending, at least in part, on the particular system implementation. In some embodiments of the invention, far field gain for the antenna array is reduced by configuring the network so that the amplitude and phase of the current in each patch-antenna 104, 108 is such that the overall far field is sufficiently low enough for the intended application. For example, the current phases of the perimetric patch-antennas 108 may lag by specific or predetermined amounts from the current phase of the central patch-antenna 104. This phase lag, along with the appropriate current amplitudes, pulls the radiation beam away from the center or broadside of the antenna array and makes it wider, thus reducing far field gain.

In some embodiments of the invention, the patch-antennas 104, 108 may have a dual linear polarization, which may help the RFID reader 100 read RFID tags at arbitrary orientations. With dual linear polarization, the RFID reader 100 may also include a dual network (one for each polarization). Alternative embodiments may include patch-antennas or other antenna elements (e.g., different antenna types, sizes, shapes, materials, layouts, etc.) having a linear polarization or circular polarization.

FIG. 4 illustrates another exemplary embodiment of a planar distributed RFID reader 200 embodying one or more aspects of the present disclosure. As shown, the RFID reader 200 includes a 1×3 array of patch-antennas 204, 208 distributed uniformly or evenly under a planar surface 212 such that there is one central patch-antenna 204 positioned generally between two perimetric patch-antennas 208.

With continued reference to FIG. 4, each patch-antenna 204, 208 is fed by a different port 216, 220, 224, respectively. In the illustrated embodiment of FIG. 4, the central patch-antenna 204 may be fed or excited with a voltage of one volt with degrees phase delay (1<0), and each perimetric patch-antenna 208 may be fed or excited with a voltage of 0.25 volts with 100 degrees phase delay (0.25<100). The port 216 may be configured with normalized voltage of 1<0, and the ports 220, 224 may be configured with normalized voltage of 0.25<100.

Alternative embodiments may include excitation of one or more of the patch-antennas 204, 208 with different voltages and/or different phase delays. For example, FIG. 5 illustrates an embodiment in which only the central patch-antenna 204 may be fed with a voltage of one volt with zero degrees phase delay (1<0), and the perimetric patch-antennas 208 are not connected to any ports or network. Instead, the perimetric patch-antennas 208 are excited or fed parasitically from the central patch-antenna 204 such that electromagnetic energy from the central patch-antenna 204 is coupled to the perimetric patch-antennas 208. If the parasitic patches 208 are located at appropriate distance from the central patch-antenna 204, currents are induced to the parasitically-fed patch-antennas 208 at amplitudes and phases equivalent or approximately equal to that of the perimetric patch-antennas 208 shown in FIG. 4 (e.g., voltage of 0.25 volts with 100 degree phase delay, etc.). In which case, the array of three patch-antennas 204, 208 shown in FIG. 5 would thus create a similar radiation pattern as the pattern shown in FIG. 4A.

With continued reference to FIG. 4, the RFID reader 200 may also include a network that distributes electromagnetic energy to the patch-antennas 204, 208. In this exemplary implementation, the different patch-antennas 204, 208 may be turned on at different times to avoid high far field gain. This also allows a RFID tag to be activated from the corresponding patch-antenna 204, 208 that is underneath the RFID tag at the time that corresponding patch-antenna 204, 208 is turned on.

In some embodiments, the patch-antennas 204, 208 may have a dual linear polarization, which may help the RFID reader 200 read RFID tags at arbitrary orientations. With dual linear polarization, the RFID reader 200 may also include a dual network (one for each linear polarization). Alternative embodiments may include patch-antennas or other antenna elements (e.g., different antenna types, sizes, shapes, materials, layouts, etc.) having a linear polarization or circular polarization.

FIG. 6 illustrates another exemplary embodiment of a planar distributed RFID reader 300 embodying one or more aspects of the present disclosure. As shown, the RFID reader 300 includes a 3×3 array of patch-antennas 304, 308 distributed uniformly or evenly under a planar surface 312 such that there are eight perimetric patch-antennas 308 generally about one central patch-antenna 304. In this particular embodiment, only the central patch-antenna 304 is fed or excited, and the eight perimetric patch-antenna elements 308 are not connected to any ports or network. Instead, the perimetric patch-antennas 308 are excited or fed parasitically from the central patch-antenna 304 such that electromagnetic energy from the central patch-antenna 304 is coupled to the perimetric patch-antennas 308. This is unlike the conventional reader 100 shown in FIG. 3 in which all nine patch-antennas 104, 108 are fed or excited by a different port such that the reader 100 includes nine ports.

In the particular example shown in FIG. 6, the central patch-antenna 304 may have a dual linear polarization and be fed by two ports 316. Each port 316 is responsible for a different polarization. Alternatively, the central patch-antenna element 304 may be fed by a different number of ports and/or be linear polarized, dual polarized, or circularly polarized.

With continued reference to FIG. 6, the eight perimetric patch-antennas 308 may be parasitic metal elements, which are parasitically fed and coupled electromagnetically to the central patch-antenna 304. Accordingly, this FIG. 6 embodiment does not include a network that distributes electromagnetic energy to the patch-antennas 304, 308, which, in turn, may allow for cost savings and reduced complexity.

In some embodiments, the array of patch-antennas 304, 308 may be located on a 9 inch×9 inch ground plane. Alternative embodiments may include patch-antennas or other antenna elements (e.g., different antenna types, sizes, shapes, materials, layouts, etc.) having a dual linear polarization, linear polarization, or circular polarization on larger or smaller ground planes.

During an exemplary operation, the currents of the perimetric patch-antennas 308 are lagging appropriately with respect to the current of the central patch-antenna 304 to reduce far field gain. To accomplish the current lag, the perimetric patch-antennas 308 may be spaced a predetermined distance (e.g., between one-half wavelength and one wavelength, etc.) from the central patch-antenna 304 to induce appropriate amplitude and phase currents to the perimetric patch-antennas 308. In addition, the sizing of the perimetric patch-antennas 308 (e.g., approximately one-half wavelength long, etc.) may also be determined so as to induce the appropriate currents. Various materials may be used for the patch-antennas 304, 308, such as metals. By way of example, stainless steel or brass may be used for the patch-antennas 304, 308 due to their relatively low cost and low loss characteristics.

FIG. 7 graphically illustrates exemplary simulated test results of return loss (S11) in decibels versus frequency in Gigahertz for the port 316 associated with the central patch-antenna 304 of the RFID reader 300. The port isolation is about 14 decibels. The port isolation refers to the isolation between the two orthogonal ports at the central patch-antenna 304. The perimetric patch-antennas 308 are responsible for the relatively wide bandwidth.

FIG. 8 graphically illustrates exemplary simulated test results of far field directivity/gain pattern for the RFID reader shown in FIG. 6 at a frequency of 915 MHz and directivity is 7.890 dBi (decibels referenced to isotropic gain). A comparison of FIG. 2 with FIG. 8 reveals that the directivity of the antenna array shown in FIG. 6 is generally less than the gain of a single patch-antenna shown in FIG. 1.

FIG. 9 graphically illustrates exemplary simulated test results of near field intensity for the RFID reader 300 at a plane above the array and at a height where RFID tags would be most probably located. For the example shown in FIG. 9, the distance z=48.85 millimeters, which is the distance of plane the near field is drawn from the ground plane on which the patch-antennas 304, 308 are sitting. The near field intensity for the other port 316 has a similar pattern rotated by 90 degrees. A time study may reveal that different antenna elements may turn on at different times. FIG. 9 also shows gaps at near field coverage at about the center of the patch-antennas 304, 308, but these are small enough to ensure that RFID tags are read consistently by the RFID reader 300.

FIG. 10 illustrates another exemplary embodiment of a planar distributed RFID reader 400 embodying one or more aspects of the present disclosure. As shown, the RFID reader 400 includes patch-antennas 404, 408 distributed uniformly or evenly under a planar surface 412 such that there are four perimetric patch-antennas 408 generally about one central patch-antenna 404. The perimetric patch-antennas 408 are disposed generally at the respective corners of the planar surface 412.

In this exemplary embodiment, the central patch-antenna 404 may have a dual linear polarization and be fed by two ports. The four perimetric patch-antennas 408 may be parasitic metal elements, which are parasitically fed and coupled electromagnetically to the central patch-antenna 404. Accordingly, this embodiment does not include a network that distributes electromagnetic energy to the patch-antennas 404, 408, which, in turn, may allow for cost savings and reduced complexity.

In some embodiments, the patch-antennas 404, 408 may be located on a 9 inch×9 inch ground plane. Alternative embodiments may include patch-antennas or other antenna elements (e.g., different antenna types, sizes, shapes, materials, layouts, etc.) having a dual linear polarization, linear polarization, or circular polarization on larger or smaller ground planes.

FIG. 11 graphically illustrates exemplary simulated test results of far field directivity/gain pattern for the RFID reader 400. FIG. 12 graphically illustrates exemplary simulated test results of near field for the RFID reader 400. For the example shown in FIG. 12, the distance z=48.7896 millimeters, which is the distance of the plane the near field is drawn from the ground plane on which the patch-antennas 404, 408 are sitting.

A comparison of FIGS. 8 and 11 reveals that the RFID reader 400 (FIG. 11) has a lower far field directivity than the RFID reader 300 (FIG. 8). But a comparison of FIG. 9 with FIG. 12 reveals that the RFID reader 400 (FIG. 12) has near field coverage with more gaps at the edges than does the RFID reader 300 (FIG. 9), where the additional gaps may reduce the probability for successful RFID tag reads with the RFID reader 400. For the simulated test results herein, the measured pattern gains are about one decibel or less and the simulation results assumed perfect conductors. The exemplary simulated test results shown in the figures or otherwise disclosed herein have been provided solely for purposes of illustration only and not for purposes of limitation, as other embodiments may be configured differently and provide different operational characteristics than that shown in the figures.

FIG. 13 illustrates another exemplary embodiment of a planar distributed RFID reader 500 embodying one or more aspects of the present disclosure. As shown, the RFID reader 500 includes inner and outer patch-antennas 504, 508 disposed under a planar surface 512. The inner patch-antenna 504 may be a dual polarized metal patch, and the outer patch-antenna 508 may be an annular-shaped (e.g., ring-shaped, etc.) metal patch disposed generally around or about the inner patch-antenna 504.

In this exemplary embodiment, the central patch-antenna 504 may have a dual linear polarization and be fed by two ports. The outer patch-antenna 408 may be a ring patch element, which is parasitically fed and coupled electromagnetically to the central patch-antenna 504. In some embodiments, the patch-antennas 504, 508 may be located on a 9 inch×9 inch ground plane. In some embodiments, the inner and outer patch-antennas 504, 508, the ground plane, and the opening of the outer patch-antenna 508 in which the inner patch-antenna 504 is disposed may all be substantially square. Alternative embodiments may include patch-antennas or other antenna elements (e.g., different antenna types, sizes, shapes, materials, layouts, etc.) having a dual linear polarization, linear polarization, or circular polarization on larger or smaller ground planes.

Continuing with this example, the central patch-antenna 504 may have an approximate length of one-half wavelength (resonant element), and the outer patch-antenna 508 may have approximately a perimeter length of two wavelengths. During an exemplary operation of the RFID reader 500, the first order mode may be excited on the inner patch-antenna patch 504. A second order mode may be excited on the outer patch-antenna 508 through the electromagnetic/parasitic coupling from the inner patch-antenna 504.

FIG. 14 graphically illustrates exemplary simulated test results of the surface currents in amps per meter (A/m) for the inner and outer patch-antennas 504, 508 of the RFID reader 500. Return loss (S1,1) and port isolation (S2,1) are shown in FIG. 15. The central-patch antenna 504 may have one port (linear polarization) or two ports (dual linear polarization or circular polarization). In FIG. 15, the port isolation S2,1 refers to isolation between two ports. The superposition of the fields of the first order mode on the inner patch-antenna 504 and the second order mode on the outer patch-antenna 508 (which has four lobes and are not broadside) may create an overall far field as shown in FIG. 16. The far field gain associated with the RFID reader 500 may be relatively low as compared to a typical patch far field gain.

Near field intensity at a plane above the RFID reader 500 is shown in FIG. 17. Near field coverage provided by the RFID reader 500 is relatively good, and near field intensity of the second port has a similar pattern rotated by 90 degrees. The coverage of both polarizations creates an almost uniform coverage.

Accordingly, various exemplary embodiments disclosed herein may provide relatively low cost and relatively uncomplicated ways (e.g., coupling electromagnetic mechanisms without involving complicated networks) to distribute electromagnetic energy over a wide area for near field RFID applications.

Certain terminology is used herein for purposes of reference only, and thus is not intended to be limiting. For example, terms such as "upper", "lower", "above", "below", "top", "bottom", "upward", and "downward" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A passive radio-frequency identification (RFID) reader operable for creating a relatively uniform near field adjacent a planar surface for reading RFID tags generally above the planar surface, the RFID reader comprising:
   a plurality of antenna elements distributed in an array underneath the planar surface, and including:
      two or more perimetric antenna elements;
      a central antenna element located within the array generally between the perimetric antenna elements;
   a network for distributing electromagnetic energy to the antenna elements such that a current phase of at least one of the perimetric antenna elements is out of phase with and lagging a current phase of the central antenna element;
   whereby the antenna elements are capable of being turned on at different times for avoiding high far field gain, such that an RFID tag is activated from a corresponding one of the antenna elements that is substantially directly underneath the RFID tag at the time the corresponding antenna element is turned on.

2. The RFID reader of claim 1, wherein at least one of the antenna elements is configured with a dual linear polarization, linear polarization, or circular polarization.

3. The RFID reader of claim 1, wherein the plurality of antenna elements comprises a 3×3 array of nine patch-antennas such that there are eight perimetric patch-antennas generally about one central patch-antenna that is generally centrally located within the array relative to the eight perimetric antenna elements.

4. The RFID reader of claim 1, wherein the plurality of antenna elements comprises a 1×3 array of three patch-antennas such that there is one central patch-antenna generally centrally located between two perimetric patch-antennas.

5. The RFID reader of claim 4, wherein the central patch-antenna is fed with a voltage of one volt with zero degree delay, and wherein each perimetric patch-antenna is fed with a voltage of 0.25 volts with 100 degrees phase delay.

6. The RFID reader of claim 1, wherein each antenna element is fed by a port.

7. The RFID reader of claim 1, wherein the RFID reader is operable for creating a substantially uniform near field adjacent a planar surface having a length of more than one wavelength, for reading RFID tags swiped across the planar surface.

8. The RFID reader of claim 1, wherein the plurality of antenna elements is evenly distributed in an array underneath the planar surface.

9. The RFID reader of claim 1, wherein the network is configured for distributing electromagnetic energy to the antenna elements such that the current phase lag and current amplitudes of the antenna elements such that the radiation beam is pulled away from the center of the antenna array and widened thereby reducing far field gain.

10. A RFID system comprising the RFID reader of claim 1 and a RFID tag, the RFID tag including an antenna and an integrated circuit operable for storing information, the tag antenna operable for receiving energy radiated by the antenna elements of the RFID reader for powering the integrated circuit, the RFID reader operable for transmitting a signal to the RFID tag and for receiving a response to the signal from the RFID tag to recognize information of the RFID tag.

11. The RFID reader of claim 10, wherein the plurality of antenna elements comprise a 3×3 array of nine patch-antennas such that there are eight perimetric patch-antennas generally about one central patch-antenna that is generally centrally located within the array relative to the eight perimetric antenna elements.

12. The RFID reader of claim 11, wherein the 3×3 array of patch-antenna is located on a 9 inch×9 inch ground plane, and wherein the RFID reader is operable as a planar RFID reader at 900 MHz.

13. A passive radio-frequency identification (RFID) reader operable for creating a relatively uniform near field adjacent a planar surface for reading RFID tags above the planar surface, the RFID reader comprising:
   a plurality of antenna elements distributed in an array underneath the planar surface, and including:
      two or more perimetric antenna elements;
      a central antenna element located within the array generally between the perimetric antenna elements;
      the two or more perimetric antenna elements being parasitically coupled to the central antenna element, such that a current phase of at least one of the perimetric antenna elements is out of phase with and lagging a current phase of the central antenna element, thereby reducing far field gain.

14. The RFID reader of claim 13, wherein the central antenna element is fed by two or more ports.

15. The RFID reader of claim 13, wherein the central patch-antenna is fed with a voltage of one volt with zero degree delay, and wherein each perimetric patch-antenna is fed parasitically from the central patch-antenna.

16. The RFID reader of claim 15, wherein the perimetric patch-antennas are fed parasitically from the central patch-antenna such that the perimetric patch-antennas are fed with a voltage of 0.25 volts and 100 degree phase delay.

17. The RFID reader of claim 13, wherein one or more feeds are connected only to the central antenna element such that the perimetric antenna elements are parasitically fed from the central patch-antenna without any feed connected to the perimetric antenna elements.

18. The RFID reader of claim 13, wherein the central antenna element is configured with a dual linear polarization, linear polarization, or circular polarization.

19. The RFID reader of claim 13, wherein the perimetric patch-antennas are spaced between one-half wavelength and one wavelength from the central patch-antenna, and wherein the perimetric patch-antennas are approximately one-half wavelength long.

20. The RFID reader of claim 13, wherein the RFID reader does not include a network distributing electromagnetic energy to each of the antenna elements.

21. The RFID reader of claim 13, wherein the plurality of antenna elements comprises an array of five patch-antennas such that there are four perimetric patch-antennas generally about one central patch-antenna that is generally centrally located within the array relative to the four perimetric antenna elements.

22. The RFID reader of claim 21, wherein:
the five patch-antenna array is located on a 9 inch×9 inch ground plane;
each perimetric patch-antenna is located adjacent a respective corner of the ground plane; and
the central patch-antenna is substantially at the center of the ground plane.

23. The RFID reader of claim 13, wherein the RFID reader is operable for creating a substantially uniform near field adjacent a planar surface having a length of more than one wavelength, for reading RFID tags swiped across the planar surface.

24. The RFID reader of claim 13, wherein the plurality of antenna elements is evenly distributed in an array underneath the planar surface.

25. A RFID system comprising the RFID reader of claim 13 and a RFID tag, the RFID tag including an antenna and an integrated circuit operable for storing information, the tag antenna operable for receiving energy radiated by the antenna elements of the RFID reader for powering the integrated circuit, the RFID reader operable for transmitting a signal to the RFID tag and for receiving a response to the signal from the RFID tag to recognize information of the RFID tag.

26. A passive radio-frequency identification (RFID) reader operable for creating a relatively uniform near field adjacent a planar surface for reading RFID tags generally above the planar surface, the RFID reader comprising:
a first antenna element having a length of about one-half wavelength;
a second antenna element surrounding the first antenna element, and having a perimeter length of about two wavelengths, the second antenna element being parasitically coupled to the first antenna element such that a first order mode is excited on the first antenna element and a second order mode is excited on the second antenna element through the parasitic coupling from the first antenna element.

27. The RFID reader of claim 26, wherein the first antenna element has a dual linear polarization.

28. The RFID reader of claim 26, wherein:
the first antenna element is substantially square; and
the second antenna element includes a substantially square opening in which the first antenna element is positioned such that the second antenna element generally surrounds the first antenna element.

29. The RFID reader of claim 26, wherein a feed is connected only to the first antenna element such that the second antenna element is parasitically fed from the first antenna element without any feed connected to the second antenna element.

30. A RFID system comprising the RFID reader of claim 26 and a RFID tag, the RFID tag including an antenna and an integrated circuit operable for storing information, the tag antenna operable for receiving energy radiated by the antenna elements of the RFID reader for powering the integrated circuit, the RFID reader operable for transmitting a signal to the RFID tag and for receiving a response to the signal from the RFID tag to recognize information of the RFID tag.

31. A method relating to the operation of a passive radio-frequency identification (RFID) reader that includes a plurality of antenna elements distributed in an array generally evenly underneath a planar surface and operable for creating a relatively uniform near field adjacent the planar surface for reading RFID tags generally above the planar surface, the method comprising:
turning on the antenna elements at different times such that a RFID tag above the planar surface is activated from a corresponding one of the antenna elements that is substantially directly underneath the RFID tag at the time the corresponding antenna element is turned on, whereby turning on the antenna elements at different times helps avoid high far field gain.

* * * * *